United States Patent
Men

(10) Patent No.: US 6,796,750 B2
(45) Date of Patent: Sep. 28, 2004

(54) CUTTING TOOL AND CUTTING INSERT THEREFOR

(75) Inventor: Yuri Men, Haifa (IL)

(73) Assignee: Iscar Ltd., Tefen (IL)

( * ) Notice: Subject to any disclaimer, the term of this patent is extended or adjusted under 35 U.S.C. 154(b) by 34 days.

(21) Appl. No.: 10/245,379

(22) Filed: Sep. 18, 2002

(65) Prior Publication Data

US 2003/0059262 A1 Mar. 27, 2003

(30) Foreign Application Priority Data

Sep. 24, 2001 (IL) .............................................. 145574

(51) Int. Cl.⁷ .............................................. B23B 27/22
(52) U.S. Cl. ........................... 407/35; 407/67; 407/102; 407/103
(58) Field of Search .............................. 407/35, 67, 66, 407/69, 102, 103

(56) References Cited

U.S. PATENT DOCUMENTS

| | | | | |
|---|---|---|---|---|
| 4,812,087 A | | 3/1989 | Stashko ........................ | 407/42 |
| 5,236,288 A | | 8/1993 | Flueckiger .................... | 407/38 |
| 5,346,336 A | | 9/1994 | Rescigno ..................... | 407/104 |
| 5,658,100 A | * | 8/1997 | Deiss et al. ................... | 407/35 |
| 5,810,518 A | | 9/1998 | Wiman et al. ............... | 407/102 |
| 5,934,844 A | | 8/1999 | Woolley ....................... | 407/114 |
| 6,033,157 A | * | 3/2000 | Satran et al. .................. | 407/37 |
| 6,053,671 A | | 4/2000 | Stedt et al. .................... | 407/35 |
| 6,152,658 A | | 11/2000 | Satran et al. ................ | 407/103 |
| 6,164,878 A | | 12/2000 | Satran et al. ................ | 407/113 |
| 6,234,724 B1 | * | 5/2001 | Satran et al. ................. | 407/43 |
| 6,273,650 B1 | * | 8/2001 | Jordberg ..................... | 407/102 |
| 6,508,612 B1 | * | 1/2003 | Baca ........................... | 407/43 |
| 6,540,448 B2 | * | 4/2003 | Johnson ........................ | 407/35 |

FOREIGN PATENT DOCUMENTS

| | | |
|---|---|---|
| JP | 11-1979906 | 7/1999 |
| JP | 2000-052111 | 2/2000 |

* cited by examiner

Primary Examiner—Willmon Fridie, Jr.
(74) Attorney, Agent, or Firm—Womble Carlyle

(57) ABSTRACT

A cutting tool has at least one insert receiving pocket with a cutting insert retained therein. The insert receiving pocket has a base wall and a side wall transversely directed to the base wall with a circular recess having a peripheral wall extending downwardly from the base wall. A threaded bore extends downwardly from the lower wall of the recess. The cutting insert has an upper surface, a lower surface and a cylindrical protrusion having peripheral surface extending downwardly from the lower surface. A through bore extends through the cutting insert from the upper surface. A retaining screw passes through the through bore and threadingly engages the threaded bore with the peripheral surface abutting the peripheral wall and with the lower surface abutting the base wall.

43 Claims, 6 Drawing Sheets

CUTTING TOOL AND CUTTING INSERT THEREFOR

FIELD OF THE INVENTION

The present invention relates to a cutting tool employing indexable cutting inserts and in particular a milling cutter retaining round cutting inserts.

BACKGROUND OF THE INVENTION

Cutting tools having cutting inserts with round cutting edges are known. Typically, a cutting insert of this kind comprises a round upper surface, a round lower surface and a side surface extending between the upper and lower surfaces. The intersection of the upper surface and the side surface forms a round cutting edge. An example of a cutting insert of such a kind is disclosed in U.S. Pat. No. 5,934,844 to Woolley. Typically, the cutting insert is retained in an insert receiving pocket formed in a forward portion of the tool.

A simple way of retaining the cutting insert to the insert receiving pocket is by using a retaining screw that passes through a through bore in the cutting insert and threadingly engages a threaded bore in a base wall of the insert receiving pocket. A disadvantage of this kind of cutting tool is that the cutting insert may rotate about its axis during machining. Also, radial and axial cutting forces acting on the cutting insert which is supported only by the retaining screw, a fact that limits the use of such a cutting tool to light machining conditions.

There are known cutting tools that provide support to the side of the insert. For example, U.S. Pat. No. 5,346,336 to Roscigno discloses a metal cutting insert that comprises a top surface which is intersected by a frusto-conical edge surface to form therewith a round cutting edge. Five equidistantly spaced flat facets are formed in the edge surface. Upper ends of the facets are spaced below the cutting edge. A fixing screw secures the insert to the seat of a holder, such that two of the facets are pressed against respective flat contact areas formed on a locating surface of the holder. Each facet forms an acute angle relative to a central axis of the insert.

A disadvantage of the insert and holder of '336 is that the number of indexing positions is limited and it depends on the required angle between the two flat contact areas of the holder. Furthermore, the insert is not provided with supporting means to prevent loading and bending of the fixing screw as a result of radially outwardly directed forces that act, for example, in the direction of the arrow of the numeral 10 in FIG. 4 of '336.

Other cutting inserts having flat support surfaces on their side surfaces are shown, for example, in U.S. Pat. No. 6,053,671 to Stedt et al., U.S. Pat. No. 6,152,658 to Satran et al. and U.S. Pat. No. 6,164,878 to Satran et al. In these patents, a lower surface of the insert abuts a base wall of the insert receiving pocket and the side surface of the insert is pressed against a side wall of the insert receiving pocket. In order to index each of these cutting inserts into a new cutting position, the retaining screw has to be completely loosened and the cutting insert has to be lifted upwardly from its pocket until its side abutment surfaces no longer abut the side walls of the insert receiving pocket. Only then, the insert can be rotated into a new indexed position.

In U.S. Pat. No. 5,658,100 to Deiss et al. there is disclosed a cutting insert in which its lower surface abuts a base wall of the insert receiving pocket. The insert is secured to the base wall by means of a retaining screw. In order to prevent rotation of the cutting insert about its axis, the cutting insert is provided with a plurality of depressions in its top surface. The depressions are engaged by a clamping claw that is supported on the tool body and retained thereto by means of a securing screw.

The clamping claw of '100 complicates the construction of the tool and may disturb the flow of chips during machining. Furthermore, a disadvantage of the tool of '100 is that it is necessary to loosen both the securing screw of the clamping claw and the retaining screw of the cutting insert in order to enable rotation of the insert into another indexing position. During the rotation of the cutting insert into a new indexing position attention must be given to the exact rotational position of the cutting insert in order to guarantee that the desired depression is opposite the clamping claw to enable their mutual engagement.

In U.S. Pat. No. 5,236,288 to Flueckiger there is disclosed a round indexable cutting insert in which its lower surface abuts a base wall of an insert receiving pocket. The cutting insert is retained in the pocket by means of a retaining screw. The cutting insert is locked in fixed angular position in the pocket by a conically tipped screw which seats in a recess formed in the back face of the insert.

A disadvantage of the cutter of '288 is that the cutting insert is not well supported against radially outwardly directed cutting forces that tend to withdraw the cutting insert from its pocket. Furthermore, in order to rotate the cutting insert to a next indexing position it is required to loosen both the retaining screw and the conically tipped screw.

Another example for fastening round cutting inserts to their pockets is shown in U.S. Pat. No. 5,810,518 to Wiman et al. As shown in FIG. 5 of '518, a cutting insert is mounted on a support surface of an insert holder. The insert includes a bottom surface having grooves and planar surface portions disposed between the grooves. The support surface includes ribs which fit into respective grooves of the insert. Some of the planar surface portions of the insert bear against a planar, rib-free portion of the support surface.

Despite the fact that the ribs-grooves arrangement prevents rotation of the cutting insert, this arrangement significantly reduces the total area of the mutual tangential, axial and radial abutment surfaces between the cutting insert and its holder and, therefore, such an arrangement is not adequate for heavy machining conditions since it depends on the load carrying capacity of the retaining screw that retains the cutting insert to its holder.

In U.S. Pat. No. 4,812,087 to Stashko there is disclosed an end milling cutter that retains a plurality of round cutting inserts. Each of the inserts is mounted in an insert seat having, according to one embodiment, at least one pair of flat side surfaces in abutting relationship with associated surfaces in the pocket to obtain maximum rigidity in seating and prevent rotation of the insert. According to another embodiment, each insert seat is a rearwardly extending recess having its rear wall comprising a frusto-conical portion terminating in a lower cylindrical portion. The cutting inserts have a shape that corresponds to the shape of the seats. Since the cutting inserts are on-edge or tangentially mounted, the chips created during machining flow over the conical portion and the cylindrical portion in the side of the cutting inserts. Thus, the side surface of the cutting inserts may be damaged and affect the abutment of the cutting inserts when they are indexed to a new cutting position.

Since the round cutting inserts of '087 have their bottom face 59 seated on the seating face 50 of the pocket, they can be rearwardly seated either in the conical seat as shown in FIG. 5 or in a flat surfaces pocket as shown in FIG. 14. Furthermore, the construction of the cutting insert is such that it cannot function as a radially mounted round cutting insert having a positive rake.

Another type of round cutting insert that has a protrusion extending downwardly from a lower surface thereof is disclosed in Japanese Laid Open Patent Publication No. 11-197906. As shown in '906, the throw-away tip 10 has a protrusion 13 that extends from the rear surface of a disc-like tip 11. The protrusion is provided with flat locking surfaces 15 that join to flat joint surfaces 22 on the attaching tool. Thus, the throw-away tip 10 is prevented from rotation in its pocket.

A disadvantage of the tool of '906 is that it enables only two indexing positions of the cutting insert. Furthermore, in order to index the cutting insert the fastening screw 30 has to be completely loosened and the cutting insert has to be removed from its pocket so that it could be rotated to a new indexing position.

In Japanese Laid Open Patent Publication No. 2000-52111 there is disclosed a cutting insert having a protrusion that extends from its rear surface. However, the cutting insert of '111 is connected to its pocket through heat coupling. This means, that the inner diameter of the recess 25 of the insert pocket 23 is slightly smaller than the outer diameter of the protrusion 32 of the insert 26. Through heat coupling, convex section 32 of chip 26 is coupled with convex recessed section 25 of chip mounting seat 23, and, at the same time, concave recessed section 25 and side walls 23b and 23c apply pressure between convex section 32 and side wall 29.

A disadvantage of the tool of '111 is that the necessity to abut the side walls 23b and 23c of the pocket limits the operating range angle that may be achieved with such a tool. Furthermore, the retaining of the cutting insert through heat coupling limits the simple indexing of the cutting insert within its pocket.

It is one object of the present invention to provide a cutting tool and a round cutting insert therefor that significantly reduces or overcomes the aforementioned disadvantages.

It is a further object of the present invention to provide a secure clamping arrangement for securing the cutting insert to the cutting tool.

It is still a further object of the present invention to provide rotation limiting means to enable easy indexing of the cutting insert in its pocket.

SUMMARY OF THE INVENTION

In accordance with the present invention there is provided a cutting tool having a longitudinal axis (A), the cutting tool comprises a tool body, having at least one mounting leg formed at a forward portion thereof, the at least one mounting leg comprises an insert receiving pocket and a cutting insert retained therein;

the insert receiving pocket comprising:
   a base wall and a side wall transversely directed to the base wall;
   a substantially circular recess extending downwardly from the base wall, the recess having a lower wall bounded by an upstanding peripheral wall, and
   a threaded bore having a threaded bore axis (B) and extending downwardly from the lower wall of the recess;

the cutting insert comprising:
   an upper surface, a lower surface and a side surface extending between the upper surface and the lower surface,
   continuously peripherally extending cutting edge portions defined at an intersection between the upper surface and the side surface;
   a cylindrical protrusion extending downwardly from the lower surface, the cylindrical protrusion having a bottom surface surrounded by a peripheral surface, and
   a through bore having a bore axis (E) and extending between the upper surface and the bottom surface;

wherein:
   a retaining screw passes through the through bore and threadingly engages the threaded bore;
   the peripheral surface of the cutting insert abuts the peripheral wall of insert receiving pocket; and
   the lower surface of the cutting insert abuts the base wall of the insert receiving pocket.

If desired, the cutting insert subtends an operating range angle (δ) of 330° at the bore axis (E).

Preferably, the upstanding peripheral wall is provided with a cutout that extends axially rearwardly and radially inwardly with respect to the longitudinal axis.

Typically, the cutout subtends a relief angle (α) at the axis of the threaded bore (B) in the range from 30° to 60°.

According to a specific embodiment of the present invention, the relief angle (α) is 40°.

Preferably, the peripheral surface abuts the peripheral wall along two spaced apart contact regions adjacent the cutout.

Preferably, the side wall comprises rotation limiting means, wherein the side surface comprises rotation limiting surfaces and wherein the rotation limiting surfaces are adapted to abut the rotation limiting means.

Preferably, the cutting edge portions define a continuously peripherally extending round cutting edge.

Typically, the rotation limiting means is a flexible member.

Further typically, the rotation limiting means is an outwardly urged plunger.

Still further typically, the plunger is urged outwardly by means of a spring.

According to as specific embodiment of the present invention, the plunger is a ball plunger.

Typically, the rotation limiting surfaces are indexing abutment surfaces adapted to abut the plunger.

According to a specific embodiment of the present invention, the indexing abutment surfaces of the cutting insert are flat.

According to a preferred embodiment of the present invention, the indexing abutment surfaces of the cutting insert are indented.

Typically, the cutting insert has at least three indexing abutment surfaces.

Preferably, the rotation limiting means abuts a single rotation limiting surface that constitutes an operative rotation limiting surface and wherein the side surface remains unabutted except for the operative rotation limiting surface.

Typically, the rotation limiting surfaces are located at the side surface adjacent the lower surface.

According to a preferred embodiment, the rotation limiting surfaces are located at the side surface and open to the lower surface.

Preferably, the plunger forms an internal acute angle ($\beta$) with the axis (B) of the threaded bore.

Typically, the internal acute angle ($\beta$) is in the range from 70° to 80°.

According to a specific embodiment of the present invention, the internal acute angle ($\beta$) is 73°.

Preferably, the recess has a first diameter (D1), the protrusion has a second diameter (D2) and wherein the first diameter is larger than the second diameter.

Typically, the first diameter (D1) is larger than the second diameter (D2) by 0.01 mm to 0.03 mm.

Preferably, the upstanding peripheral wall is perpendicular to the base wall.

Further preferably, the peripheral surface is perpendicular to the lower surface.

Still further preferably, the axis (B) of the threaded bore is parallel to the axis (E) of the bore and spaced apart therefrom a first distance (L) and wherein the axis of the threaded bore is closer to the cutout than the axis of the bore.

Generally, when the protrusion is within the recess without the retaining screw threadingly engaging the threaded bore the rotation limiting means assists in adjusting the axis of the bore to be parallel to the axis of the threaded bore.

Further generally, when the protrusion is within the recess without the retaining screw threadingly engaging the threaded bore the rotation limiting means prevents falling of the cutting insert out of the insert receiving pocket.

Preferably, the rotation limiting surfaces are equally peripherally spaced around the side surface and form a plurality of indexing positions wherein when the protrusion is within the recess without the retaining screw threadingly engaging the threaded bore or when the retaining screw partially engages the threaded bore the cutting insert can be rotated around the axis of the bore from one indexing position to another indexing position.

Typically, a mechanical signal is provided when the cutting insert is indexed from one indexing position to another indexing position.

Generally, resistance to rotation of the cutting insert produces the mechanical signal.

If desired, the mechanical signal is a click.

Further if desired, the indexing positions are marked at the upper surface by indexing numerals.

There is also provided in accordance with the present invention a cutting insert, comprising:

an upper surface, a lower surface and a side surface extending between the upper surface and the lower surface, continuously peripherally extending cutting edge portions defined at an intersection between the upper surface and the side surface;

a cylindrical protrusion extending downwardly from the lower surface, the cylindrical protrusion having a bottom surface surrounded by a peripheral surface, and a through bore having a bore axis (E) and extending between the upper surface and the bottom surface;

wherein:

the side surface comprises rotation limiting surfaces adjacent, and open to, the lower surface.

Preferably, the cutting edge portions define a continuously peripherally extending round cutting edge.

Generally, the rotation limiting surfaces are indexing abutment surfaces.

According to a specific embodiment of the present invention, the indexing abutment surfaces are flat.

According to a preferred embodiment of the present invention, the indexing abutment surfaces are indented.

Typically, the cutting insert has at least three indexing abutment surfaces.

Preferably, the peripheral surface is perpendicular to the lower surface.

Further preferably, the rotation limiting surfaces are equally peripherally spaced around the side surface and form a plurality of indexing positions.

If desired, the indexing positions are marked at the upper surface by indexing numerals.

BRIEF DESCRIPTION OF THE DRAWINGS

For a better understanding of the present invention and to show how the same may be carried out in practice, reference will now be made to the accompanying drawings, in which.

DETAILED DESCRIPTION OF THE INVENTION

Figure 1:
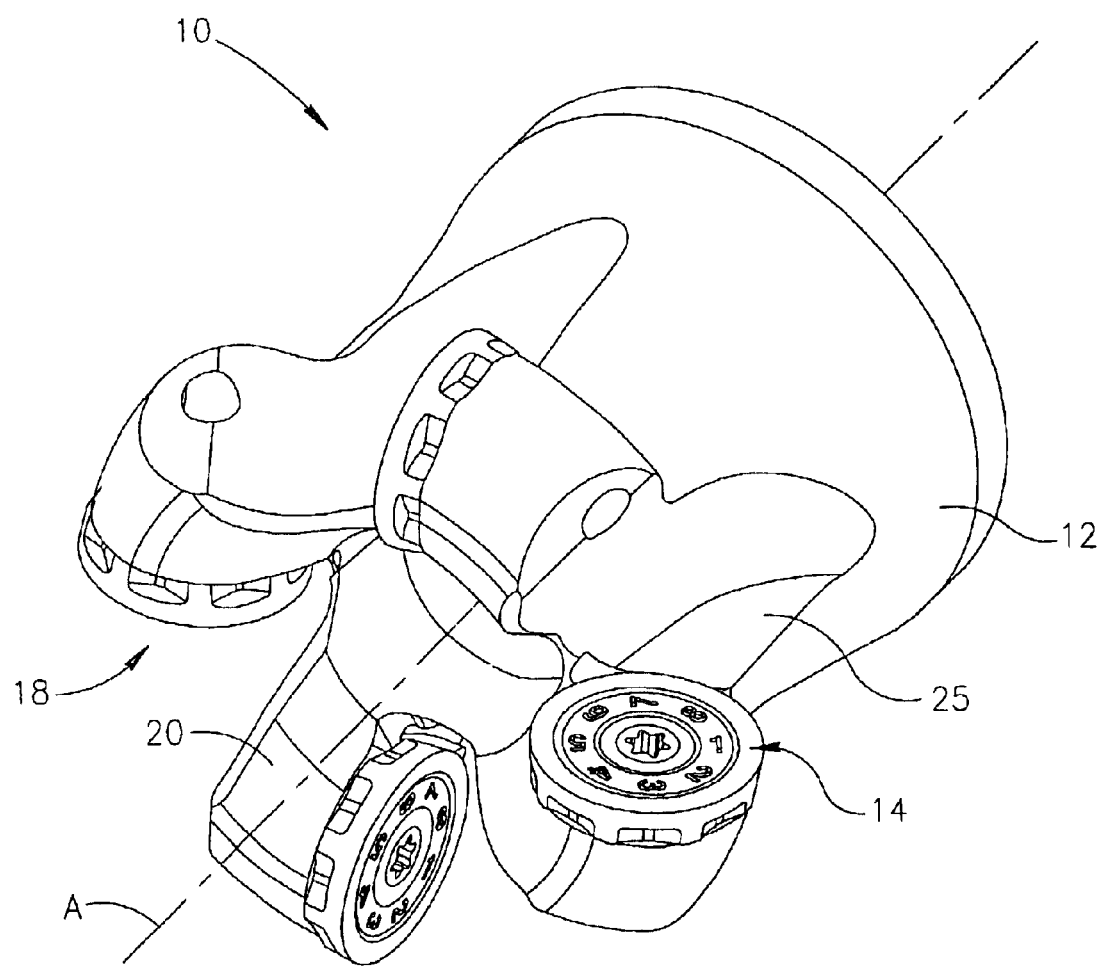
FIG. 1 is a perspective view of a cutting tool according to the present invention.
Figure 2:
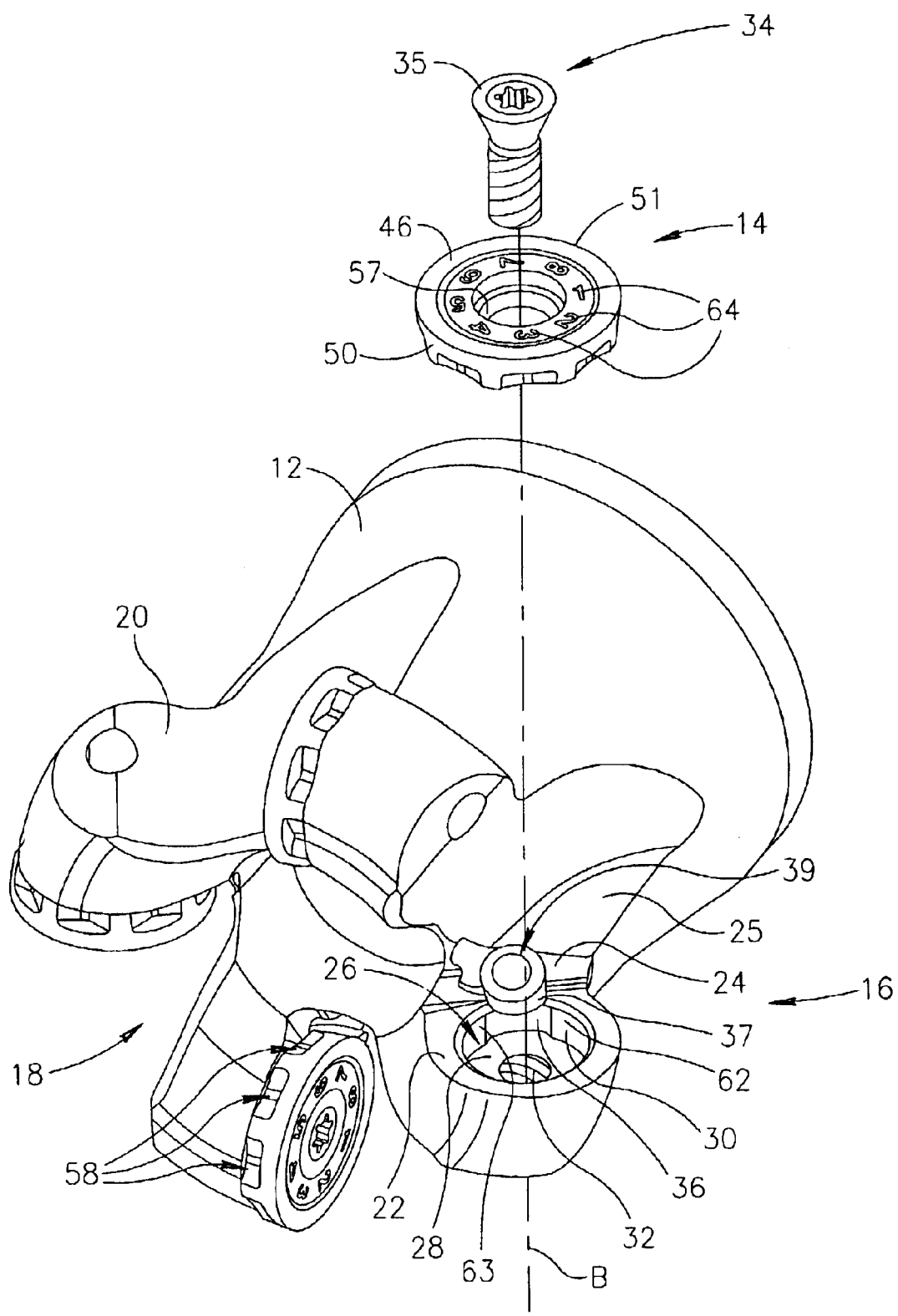
FIG. 2 is an exploded view of the cutting tool of FIG. 1 showing one cutting insert removed from its pocket.

Attention is drawn to FIGS. 1 to 7. As shown, a cutting tool 10, having a longitudinal axis A, comprises a tool body 12 and four cutting inserts 14 mounted in insert receiving pockets 16 formed in a forward portion 18 of the tool body. Although the cutting tool 10 is illustrated with four cutting inserts 14 mounted therein, the invention is equally applicable to a cutting tool having at least one insert receiving pocket with a single cutting insert mounted therein. As is clearly shown in FIGS. 1 and 2, each insert receiving pocket 16 is formed on a mounting leg 20. Each mounting leg 20 extends axially forwardly and radially outwardly with respect to the longitudinal axis A. All the insert receiving pockets are identical and therefore only one insert receiving pocket 16 will be described.

The insert receiving pocket 16 comprises a base wall 22 and a side wall 24 adjacent the base wall and transversely directed thereto. A chip gullet 25 extends rearwardly from the side wall 24. The base wall 22 is directed substantially parallel to the longitudinal axis A as seen in a front view and a side view of the cutting tool 10. A substantially circular recess 26, having a first diameter D1, extends downwardly from the base wall 22. The recess 26 has a lower wall 28 bounded by an upstanding peripheral wall 30. Preferably, the peripheral wall 30 is perpendicular to the base wall 22. A threaded bore 32, having a threaded bore axis B, extends downwardly from the lower wall 28 of the recess 26. The threaded bore 32 is adapted to threadingly receive a retaining screw 34, having a screw head 35, as will be later described.

The upstanding peripheral wall 30 is provided with a cutout 36 that extends axially rearwardly and radially inwardly with respect to the longitudinal axis A. The peripheral extension of the cutout 36 is such that the cutout subtends a relief angle α at the axis B of the threaded bore in the range from 30° to 60°. Typically, the relief angle α is 40°. A plunger retaining bore 38, having a plunger axis C, extends rearward to the cutout 36 and co-planar with the threaded bore axis B. The plunger retaining bore 38 is located on the side wall 24 of the insert receiving pocket, partially opens to the cutout 36 through a plunger locating groove 37 and forms an internal acute angle β with the threaded bore axis B. The internal acute angle β is typically in the range from 70° to 80°. According to a specific embodiment of the present invention, the internal acute angle β is 73°.

A standard plunger assembly 39 is inserted into the plunger retaining bore 38 and constitutes rotation limiting means of the tool body 12, for limiting the rotation of the cutting insert 14. The plunger assembly 39 comprises a housing 40, a loaded spring 41 retained in the rear portion of the housing, and, a ball plunger 42 that is outwardly urged by the spring 41. A front lip 43 of the housing 40 prevents the ball plunger from falling out of the housing. Thus, the ball plunger 42 has a forward portion 44 that continuously protrudes beyond the front lip 43. It is understood that the invention is not limited to use a ball plunger and any other kind of plunger or flexible member is equally applicable.

The cutting insert 14 comprises an upper surface 46, a lower surface 48 and a side surface 50 extending between the upper surface 46 and the lower surface 48. An intersection between the upper surface 46 and the side surface 50 defines continuously peripherally extending cutting edge portions, which, in the described embodiment, constitute a continuously peripherally extending round cutting edge 51.

A cylindrical protrusion 52 extends downwardly from the lower surface 48. The protrusion 52 has a bottom surface 54 surrounded by a peripheral surface 56. Preferably, the peripheral surface 56 is perpendicular to the lower surface 48. The protrusion 52 has a second diameter D2 that is slightly smaller than the first diameter D1 of the recess 26. The difference between the first diameter D1 and the second diameter D2 should be small enough to enable firm abutment of the protrusion 52 within the recess 26 and large enough to enable the free insertion of the protrusion 52 into the recess 26. As a practical range, the first diameter D1 is larger than the second diameter D2 by 0.01 mm to 0.03 mm. A through bore 57, having a bore axis E, extends between the upper surface 46 and the bottom surface 54.

Figure 3:
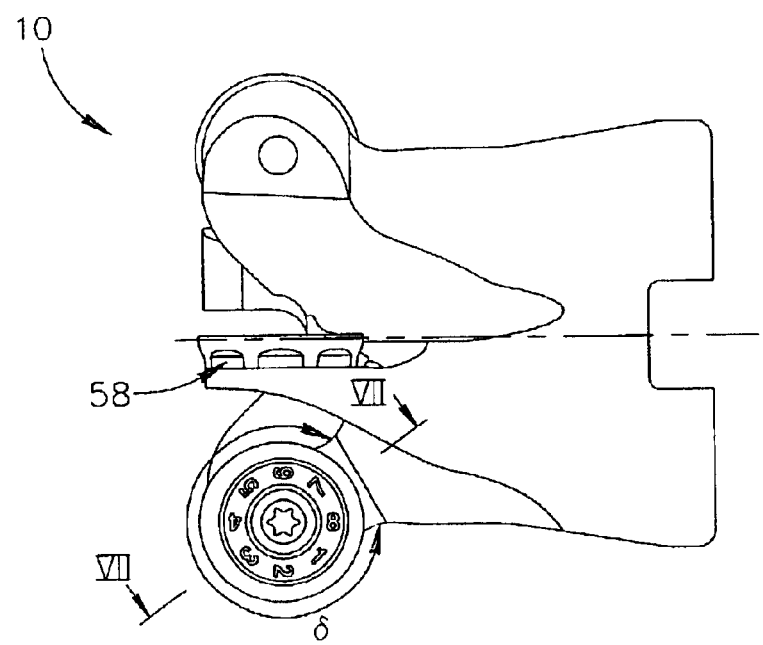
FIG. 3 is a side view of the cutting tool of FIG. 1 showing a top view of one of the cutting inserts and a side view of another cutting insert with flat indexing abutment surfaces.
Figure 4:
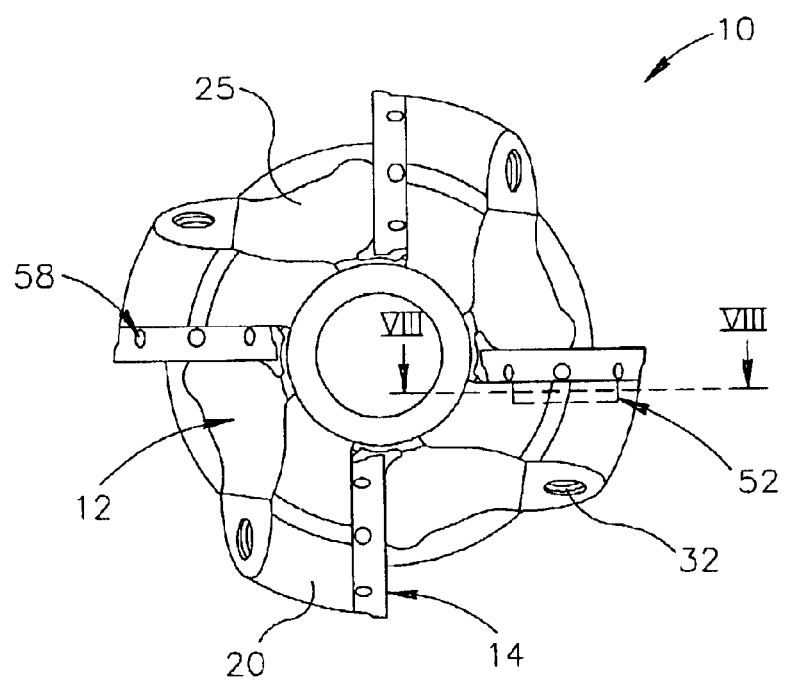
FIG. 4 is a front end view of the cutting tool of FIG. 1 showing in dashed lines the protrusion of one of the cutting inserts and showing round indented indexing abutment surfaces.
Figure 5:
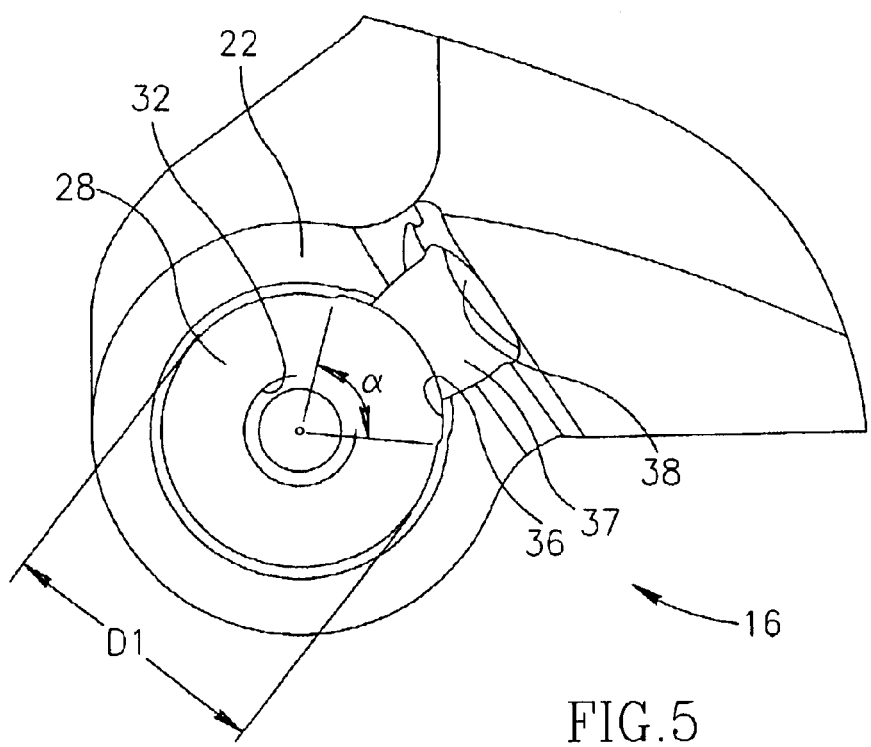
FIG. 5 is a top view of the insert receiving pocket shown in FIG. 2.
Figure 6:
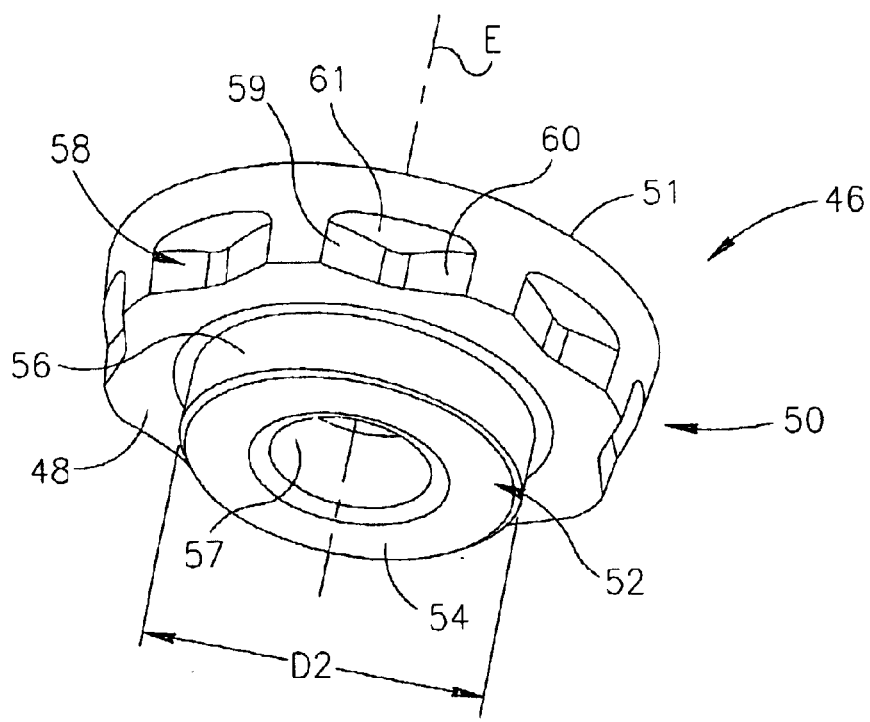
FIG. 6 is a bottom perspective view of the cutting insert shown in FIG. 2.

The side surface 50 of the cutting insert 14 is provided with equally peripherally distributed indexing abutment surfaces 58. The indexing abutment surfaces 58 constitute rotation limiting surfaces. The indexing abutment surfaces 58 are located at the lower part of the side surface 50 and open to the lower surface 48. The indexing abutment surfaces 58 are indented with respect to the side surface 50 and form widely open V-shaped grooves. Each groove has two inwardly converging groove side walls 59 and 60 and a groove upper wall 61. The groove side walls 59 and 60 are symmetrical with respect to a bisector of the V-shaped groove. The bisector being in a radial direction r of the cutting insert 14. The indexing abutment surfaces 58 do not have to be V-shaped and they can be, for example, flat surfaces forming a cutout in the side surface 50, as shown in FIG. 3, or, round indentations, as shown in FIG. 4, as long as they are capable of receiving therein the forward portion 44 of the ball plunger 42. Typically, the cutting insert 14 is provided with at least three indexing abutment surfaces 58.

When placing the cutting insert 14 in the insert receiving pocket 16, first the protrusion 52 is inserted into the recess 26, then, the cutting insert is pressed downwardly until the lower surface 48 of the cutting insert abuts the base wall 22 of the insert receiving pocket. In this position, the bottom surface 54 of the protrusion 52 always remains removed from the lower wall 28 of the recess 26. During the insertion of the protrusion 52 into the recess 26, the side surface 50 of the cutting insert comes in contact with the forward portion 44 of the ball plunger 42 and gradually presses the ball plunger rearwardly against the tension in the spring. As a consequence, the ball plunger applies a reaction force to the side surface of the cutting insert.

The plunger assembly 39 provides the cutting tool 10 with three advantages. First, during the insertion of the protrusion 52 in the recess 26, when the retaining screw 34 is not yet threadingly engaged in the threaded bore 32, the force applied by the plunger to the side surface of the cutting insert assists in adjusting the axis E of the bore to be parallel to the axis B of the threaded bore. This advantage enables to freely insert the cutting insert into its pocket without any wedging of the protrusion 52 within the recess 26.

A second advantage of the plunger assembly 39 is that when the protrusion 52 is within the recess 26, without the retaining screw 34 threadingly engaging the threaded bore 32, the plunger urges the cutting insert away therefrom so that the peripheral surface 56 of the protrusion is pressed against the peripheral wall 30 of the recess 26 thus preventing the cutting insert 14 from falling out of its pocket 16. This advantage is particularly practical for an operator during the assembly and disassembly of a cutting insert 14 in or from the tool body 12. By way of the above-described construction, the operator can assemble the cutting insert 14 in its pocket 16 using only one hand since the cutting insert is self retained in the pocket. Thus, the assembly of the cutting insert becomes easier since the operator can hold the retaining screw 34 in one hand while holding the screw tightening key in another hand without being bothered by the possible falling of the cutting insert out of its pocket.

A third advantage of the plunger assembly 39 is its use as rotation limiting means for indexing purposes. Thus, when the protrusion 52 is within the recess 26 and the lower surface 48 abuts the base wall 22, the cutting insert 14 is slightly rotated by hand until the forward portion 44 of the ball plunger 42 engages one of the indexing abutment surfaces 58. When such engagement occurs, a click is felt by the operator and also an increased resistance to the rotation of the cutting insert. The click also gives rise to a mechanical signal. In this position, the operator knows that the cutting insert is located in the desired indexing position and stops rotating the cutting insert. Now, the retaining screw 34 is threadingly engaged into the threaded bore 32.

Figure 7:
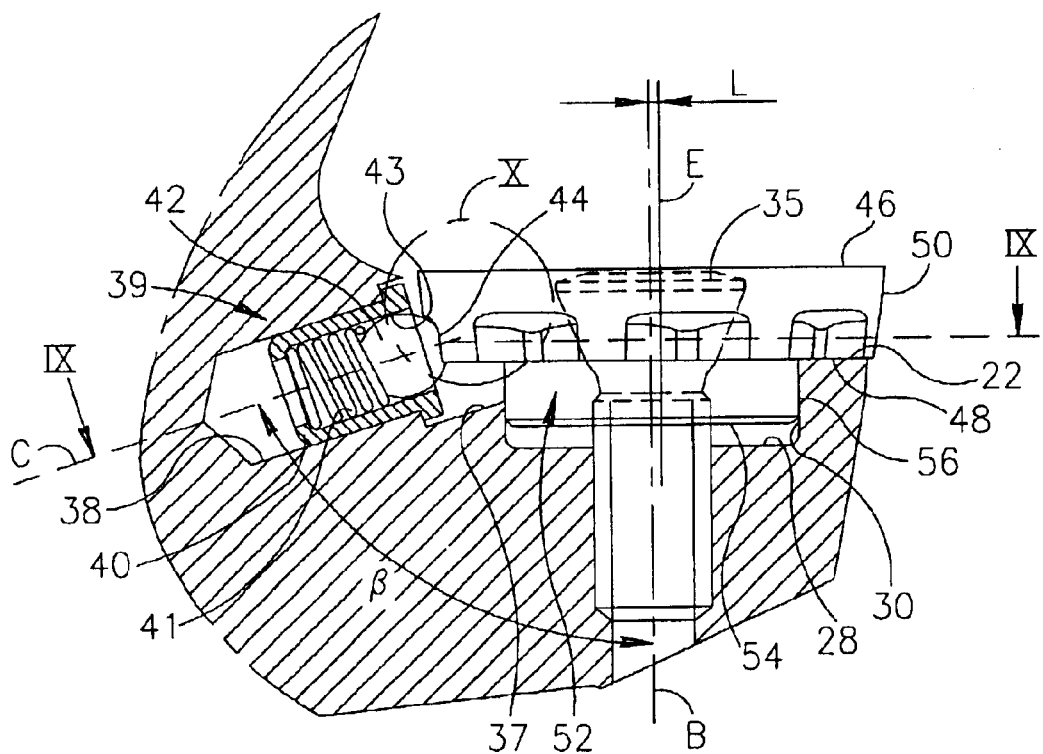
FIG. 7 is a cross-sectional view along line VII—VII in FIG. 3.
Figure 8:
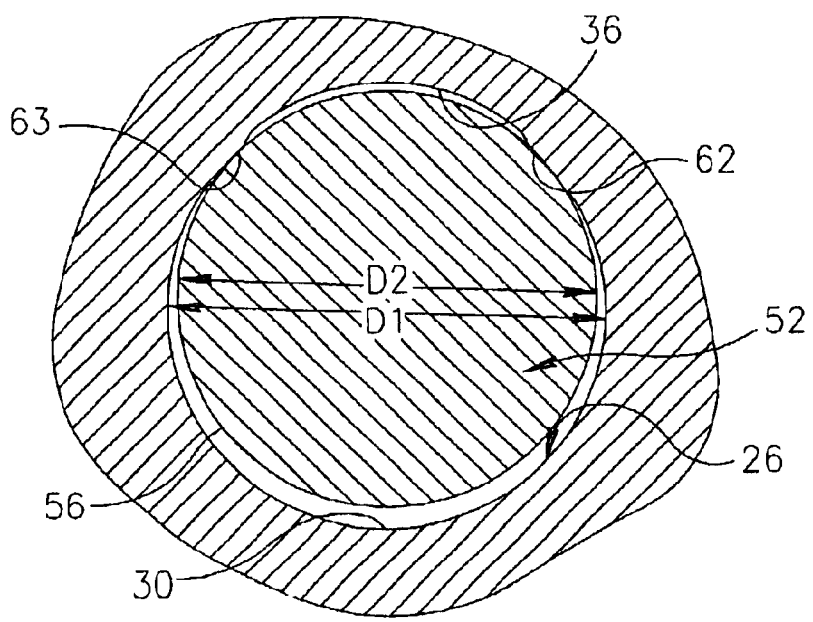
FIG. 8 is a schematic cross sectional view along line VIII—VIII in FIG. 4 where the clearances between the various parts have been exaggerated for clarification purposes.
Figure 9:
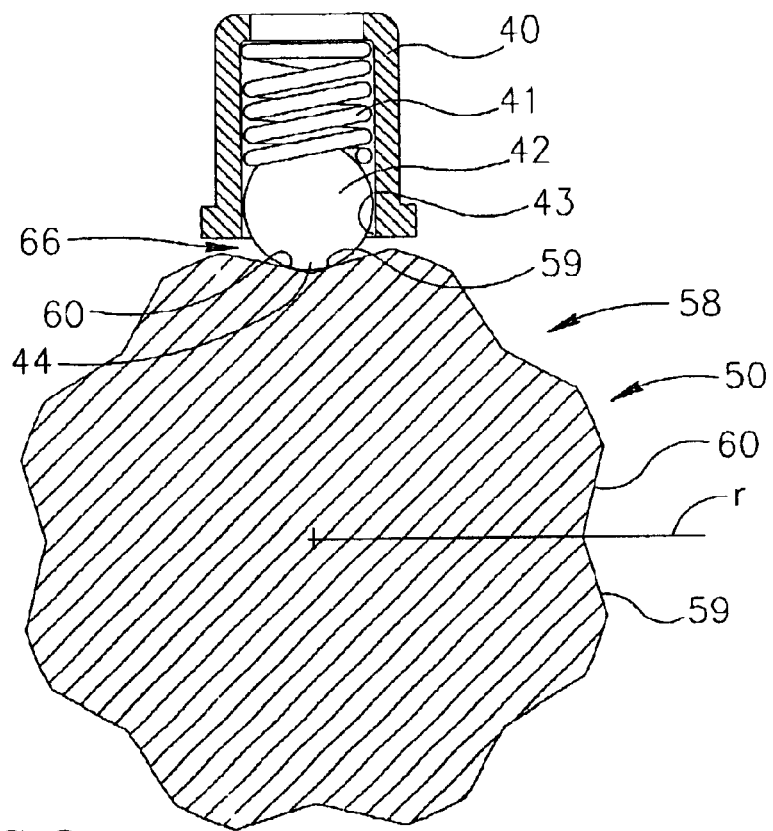
FIG. 9 is a cross-sectional view along line IX—IX in FIG. 7.
Figure 10:
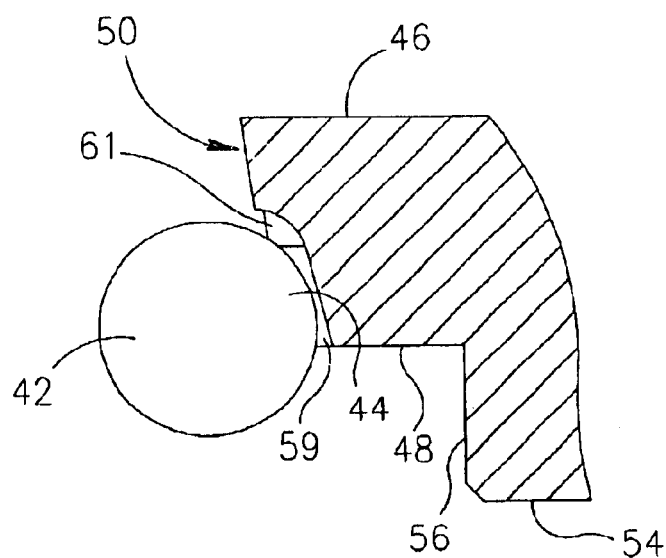
FIG. 10 is an enlarged cross-sectional view of the encircled section X in FIG. 7.

As seen in FIG. 7, the axis B of the threaded bore 32 is parallel to the axis E of the bore 57 and spaced apart therefrom a first distance L. The axis B is located closer to the cutout 36 than the axis E. Thus, when the retaining screw 34 threadingly engages the threaded bore 32, the screw head 35 urges the cutting insert 14 towards the cutout 36 against the counter action of the spring 41. During this movement of the cutting insert under the action of the retaining screw, the plunger urges the cutting insert to slightly rotate until the two groove side walls 59 and 60 uniformly abut the forward portion 44 of the plunger. In this way it is ensured that the cutting insert 14 is located at the desired indexing position. In this position, the groove upper wall 61 remains unabutted.

In the final position, when the retaining screw 34 is completely tightened, the protrusion 52 is urged against the recess 26 until the peripheral surface 56 abuts the peripheral wall 30 along two spaced apart contact regions 62 and 63 adjacent the cutout 36 and the cutout provides a clearance between the two contact regions so that the cutting insert is securely retained in its pocket.

Preferably, the upper surface 46 of the cutting insert 14 is marked with indexing numerals 64 that show the indexing position of the cutting insert. In the described embodiment, the cutting insert 14 is provided with eight indexing abutment surfaces 58 and, hence, with eight indexing numerals 64 marked with the numerals 1, 2, . . . , 8.

The construction of the cutting tool 10 with the protrusion-recess arrangement provides firm support for the cutting insert 14 against cutting forces that tend to withdraw it from of its pocket. When the cutting insert 14 is retained within its pocket, the plunger abuts a particular indexing abutment surface 58 that constitutes an operative indexing abutment surface 66. It should be noted that the entire side surface 50 remains unabutted except for the operative indexing abutment surface 66. Thus, since the protrusion 52 is retained within the recess 26, the cutting insert is prevented from any substantial translational movement relative to its pocket.

If, however, the cutting insert is subjected to large cutting forces that tend to move the cutting insert in a direction that is substantially opposite to the direction in which the retaining screw 34 urges the cutting insert, then, the maximum translational movement of the cutting insert will be the difference between the first diameter D1 of the recess and the second diameter D2 of the protrusion. Such a difference is, typically, less than the maximal allowed distortion of the retaining screw, which can be as large as 0.2 mm, so that the retaining screw will not bend beyond its elastic range. Thus, the protrusion 52 is safely secured within the recess 26 and the retaining screw 34 is not subjected to harmful distortion and the cutting tool 10 is able to cut in a large variety of directions and in rough cutting conditions.

Since the cutting insert 14 is secured to its pocket by the protrusion 52 that is retained within the recess 26, and since the entire side surface 50 of the cutting insert remains unabutted except for the single operative indexing abutment surface 66, it is clear that only that portion of the cutting edge 51 in the vicinity of the operative indexing abutment surface 66 is unable to participate in a cutting operation. In other words the rest of the cutting edge 51, not in the vicinity of the operative indexing abutment surface 66 can participate in cutting operations. Therefore, the cutting insert 14 is able to subtend a relatively large operating range angle δ that is also facilitated by the relatively thin construction of the mounting leg 20. The operating range angle defines the maximum continuous length of the cutting edge 51 usable in cutting operations. According to a specific embodiment of the present invention, the cutting insert subtends an operating range angle of 330° at the bore axis E. Thus, the cutting tool 10 is most suitable for performing a large variety of copying applications in rough cutting conditions.

It will be appreciated that the maximum operating range angle δ depends only on the required stiffness of the cutting tool. Therefore, when a certain machining application requires machining of internal shoulders, if it is possible to perform the machining in light machining conditions, the operating range angle δ can be as large as 330°.

The third advantage of the plunger assembly 39 is particularly useful when it is desired to index a cutting insert into a new indexed position. Thus, in order to index the cutting insert 14 into a new indexed position, the retaining screw 34 has to be loosened only a few turns. In this position, the cutting insert can be rotated around the bore axis E from one indexing position to another indexing position. As explained above, the mechanical signals of the click and the increased resistance to turning the cutting insert indicates to the operator that a new index position has been reached. Thus, even if the cutting insert is dirty and the indexing numerals 64 are not visible, the operator does not have to clean it and he can index the cutting insert to the next index position by the aid of the mechanical signals provided by the plunger and the indexing abutment surfaces 58.

Although the present invention has been described to a certain degree of particularity, it should be understood that various alterations and modifications could be made without departing from the scope of the invention as hereinafter claimed. For example, the cutting tool 10 can equally operate without the plunger and the indexing abutment surfaces since, when using a round cutting insert, it is not necessary to establish an exact peripheral location of the round cutting edge. The retaining by the retaining screw and the urging of the protrusion 52 into the cutout 36 ensures that the cutting insert is secured to its pocket. In practice, most of the cutting forces applied on the cutting insert act in a direction that further secure the cutting insert within its pocket. Therefore, since there is usually a very low torque that tends to rotate the cutting insert around the axis E of the bore, this torque can be resisted by the tightening of the retaining screw. Hence, the cutting tool 10 can operate also without the provision of the cutout in the insert receiving pocket.

What is claimed is:

1. A cutting tool having a longitudinal axis (A) and comprising a tool body having at least one mounting leg formed at a forward portion thereof, the at least one mounting leg comprising an insert receiving pocket and a cutting insert retained therein, the insert receiving pocket comprising:
   a base wall and a side wall transversely directed to the base wall;
   a substantially circular recess extending downwardly from the base wall, the recess having a lower wall bounded by an upstanding peripheral wall, and
   a threaded bore having a threaded bore axis (B) and extending downwardly from the lower wall of the recess;

the cutting insert comprising:
   an upper surface, a lower surface and a side surface extending between the upper surface and the lower surface,
   continuously peripherally extending cutting edge portions defined at an intersection between the upper surface and the side surface;
   a cylindrical protrusion extending downwardly from the lower surface, the cylindrical protrusion having a bottom surface surrounded by a peripheral surface, and
   a through bore having a bore axis (E) and extending between the upper surface and the bottom surface;

wherein:
   a retaining screw passes through the through bore and threadingly engages the threaded bore;
   the peripheral surface of the cutting insert abuts the peripheral wall of insert receiving pocket; and
   the lower surface of the cutting insert abuts the base wall of the insert receiving pocket.

2. The cutting tool according to claim 1, wherein the cutting insert subtends an operating range angle (δ) of 330° at the bore axis (E).

3. The cutting tool according to claim 1, wherein the cutting edge portions define a continuously peripherally extending round cutting edge.

4. The cutting tool according to claim 1, wherein the upstanding peripheral wall is perpendicular to the base wall.

5. The cutting tool according to claim 1, wherein the peripheral surface is perpendicular to the lower surface.

6. The cutting tool according to claim 1, wherein the recess has a first diameter (D1), the protrusion has a second diameter (D2) and wherein the first diameter is larger than the second diameter.

7. The cutting tool according to claim 6, wherein the first diameter (D1) is larger than the second diameter (D2) by 0.01 mm to 0.03 mm.

8. The cutting tool according to claim 1, wherein the upstanding peripheral wall is provided with a cutout that extends axially rearwardly and radially inwardly with respect to the longitudinal axis.

9. The cutting tool according to claim 8, wherein the peripheral surface abuts the peripheral wall along two spaced apart contact regions adjacent the cutout.

10. The cutting tool according to claim 8, wherein the axis (B) of the threaded bore is parallel to the axis (E) of the bore and spaced apart therefrom a first distance (L) and wherein the axis of the threaded bore is closer to the cutout than the axis of the bore.

11. The cutting tool according to claim 8, wherein the cutout subtends a relief angle (α) at the axis of the threaded bore (B) in the range from 30° to 60°.

12. The cutting tool according to claim 11, wherein the relief angle (α) is 40°.

13. The cutting tool according to claim 1, wherein the side wall comprises rotation limiting means, wherein the side surface comprises rotation limiting surfaces and wherein the rotation limiting surfaces are adapted to abut the rotation limiting means.

14. The cutting tool according to claim 13, wherein the rotation limiting means is a flexible member.

15. The cutting tool according to claim 13, wherein the rotation limiting means abuts a single rotation limiting surface that constitutes an operative rotation limiting surface and wherein the side surface remains unabutted except for the operative rotation limiting surface.

16. The cutting tool according to claim 13, wherein the rotation limiting surfaces are located in the side surface adjacent the lower surface.

17. The cutting tool according to claim 13, wherein the rotation limiting surfaces are located in the side surface and open to the lower surface.

18. The cutting tool according to claim 13, wherein the rotation limiting means is an outwardly urged plunger.

19. The cutting tool according to claim 18, wherein the plunger is urged outwardly by means of a spring.

20. The cutting tool according to claim 18, wherein the plunger is a ball plunger.

21. The cutting tool according to claim 18, wherein the rotation limiting surfaces are indexing abutment surfaces adapted to abut the plunger.

22. The cutting tool according to claim 21, wherein the indexing abutment surfaces of the cutting insert are flat.

23. The cutting tool according to claim 21, wherein the indexing abutment surfaces of the cutting insert are indented.

24. The cutting tool according to claim 21, wherein the cutting insert has at least three indexing abutment surfaces.

25. The cutting tool according to claim 18, wherein the plunger forms an internal acute angle (β) with the axis (B) of the threaded bore.

26. The cutting tool according to claim 25, wherein the internal acute angle (β) is in the range from 70° to 80°.

27. The cutting tool according to claim 25, wherein the internal acute angle (β) is 73°.

28. The cutting tool according to claim 13, wherein the rotation limiting means assists in adjusting the axis of the bore to be parallel to the axis of the threaded bore, when the protrusion is within the recess without the retaining screw threadingly engaging the threaded bore.

29. The cutting tool according to claim 13, wherein the rotation limiting means prevents the cutting insert from falling out of the insert receiving pocket, when the protrusion is within the recess without the retaining screw threadingly engaging the threaded bore.

30. The cutting tool according to claim 13, wherein the rotation limiting surfaces are equally peripherally spaced around the side surface and form a plurality of indexing positions wherein when the protrusion is within the recess without the retaining screw threadingly engaging the threaded bore or when the retaining screw partially engages the threaded bore the cutting insert can be rotated around the axis of the bore from one indexing position to another indexing position.

31. The cutting tool according to claim 30, wherein a mechanical signal is provided when the cutting insert is indexed from one indexing position to another indexing position.

32. The cutting tool according to claim 31, wherein resistance to rotation of the cutting insert produces the mechanical signal.

33. The cutting tool according to claim 31, wherein the mechanical signal is a click.

34. The cutting tool according to claim 30, wherein the indexing positions are marked in the upper surface by indexing numerals.

35. A cutting insert comprising:
   an upper surface, a lower surface and a side surface extending between the upper surface and the lower surface,
   continuously peripherally extending cutting edge portions defined at an intersection between the upper surface and the side surface;
   a cylindrical protrusion extending downwardly from the lower surface, the cylindrical protrusion having a bottom surface surrounded by a peripheral surface, and
   a through bore having a bore axis (E) and extending between the upper surface and the bottom surface;
   wherein:
   the side surface comprises rotation limiting surfaces adjacent, and open to, the lower surface.

36. The cutting insert according to claim 35, wherein the cutting edge portions define a continuously peripherally extending round cutting edge.

37. The cutting insert according to claim 35, wherein the rotation limiting surfaces are indexing abutment surfaces.

38. The cutting insert according to claim 37, wherein the indexing abutment surfaces are flat.

39. The cutting insert according to claim 37, wherein the indexing abutment surfaces are indented.

40. The cutting insert according to claim 37, wherein the cutting insert has at least three indexing abutment surfaces.

41. The cutting insert according to claim 35, wherein the peripheral surface is perpendicular to the lower surface.

42. The cutting insert according to claim 35, wherein the rotation limiting surfaces are equally peripherally spaced around the side surface and form a plurality of indexing positions.

43. The cutting insert according to claim 42, wherein the indexing positions are marked in the upper surface by indexing numerals.

* * * * *